United States Patent [19]

Gerke et al.

[11] Patent Number: 5,297,975
[45] Date of Patent: Mar. 29, 1994

[54] TERMINAL BANK FOR THE TELECOMMUNICATION AND DATA TECHNOLOGY

[75] Inventors: Dieter Gerke; Manfred Müller; Harald Bülow, all of Berlin, Fed. Rep. of Germany

[73] Assignee: Krone Aktiengesellschaft, Berlin, Fed. Rep. of Germany

[21] Appl. No.: 934,862

[22] Filed: Aug. 24, 1992

[30] Foreign Application Priority Data

Aug. 22, 1991 [DE] Fed. Rep. of Germany ....... 4127896

[51] Int. Cl.5 ............................................... H01R 9/00
[52] U.S. Cl. .................................... 439/358; 439/395; 439/457; 439/922; 439/924
[58] Field of Search ............... 439/709, 712, 716, 719, 439/922, 395, 396, 399, 404, 457, 924; 361/119, 426, 428, 358

[56] References Cited

U.S. PATENT DOCUMENTS

| | | | |
|---|---|---|---|
| 4,008,941 | 2/1977 | Smith | 439/358 |
| 4,472,764 | 9/1984 | Richard et al. | 361/426 |
| 4,790,770 | 12/1988 | Klaiber | 439/395 |
| 4,822,306 | 4/1989 | Klaiber | 439/922 |
| 4,851,967 | 7/1989 | Gerke et al. | 439/709 |
| 5,145,404 | 9/1992 | Beattie et al. | 439/719 |

FOREIGN PATENT DOCUMENTS 2451810 5/1975 Fed. Rep. of Germany ...... 439/719

*Primary Examiner*—Neil Abrams
*Attorney, Agent, or Firm*—McGlew and Tuttle

[57] ABSTRACT

The invention relates to a terminal bank for the telecommunication and data technology, with a cable connecting member 1 provided with cutting and clamping contact elements 10 for the termination of incoming cable cores 14, and a terminating element to be latched thereunto for the connection of the incoming cable cores 14 with the outgoing cable cores 37. The cutting and clamping contact elements 10 of the cable connecting member 1 have contact lugs 7, onto which bifurcated contacts 9 of the terminating element can be plugged. The terminating element is adapted as a plug connector receiving portion 2 with chambers 23 being open towards bottom, for the insertion of plug connectors 6 connected with the outgoing cable cores 37, and that the bifurcated contacts 9 are provided at the plug connectors 6.

14 Claims, 3 Drawing Sheets

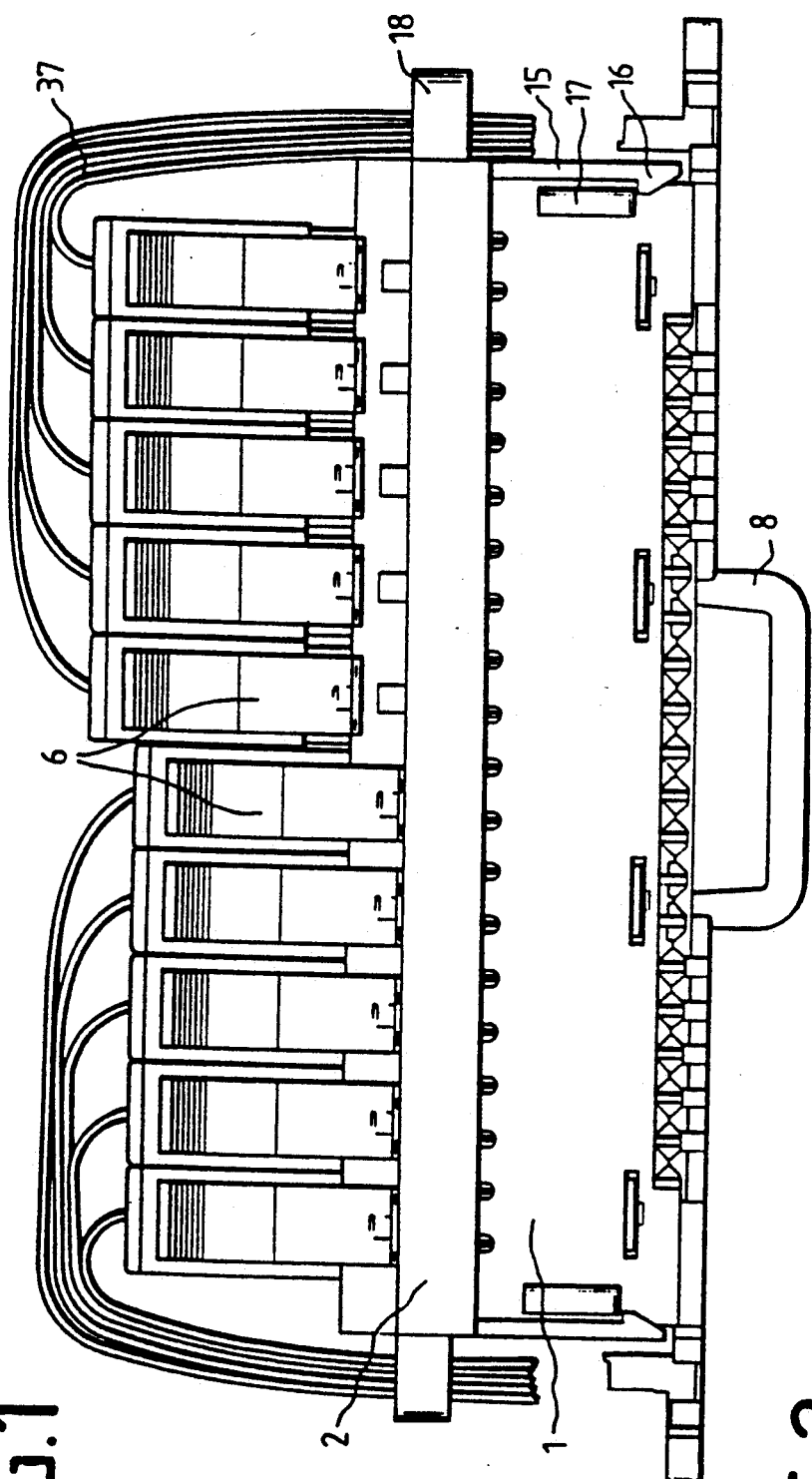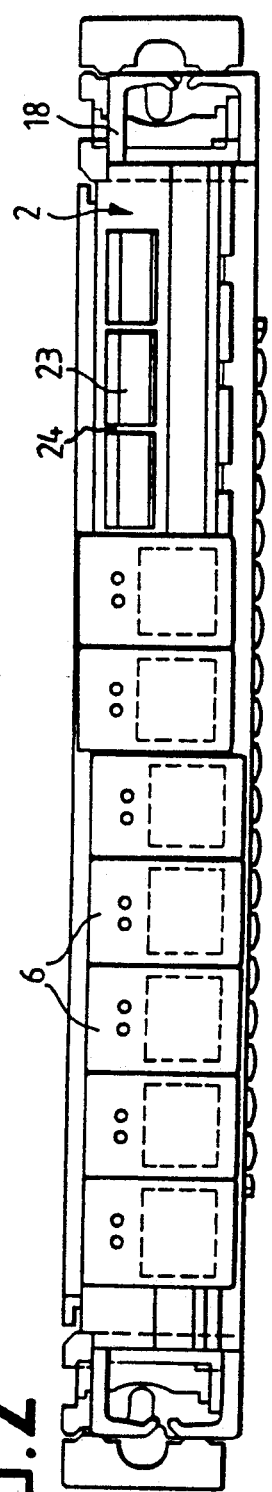

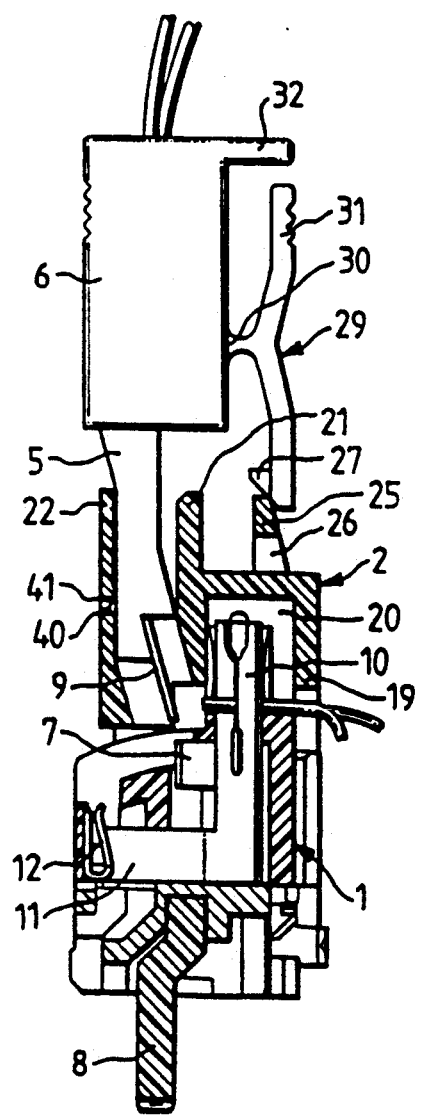
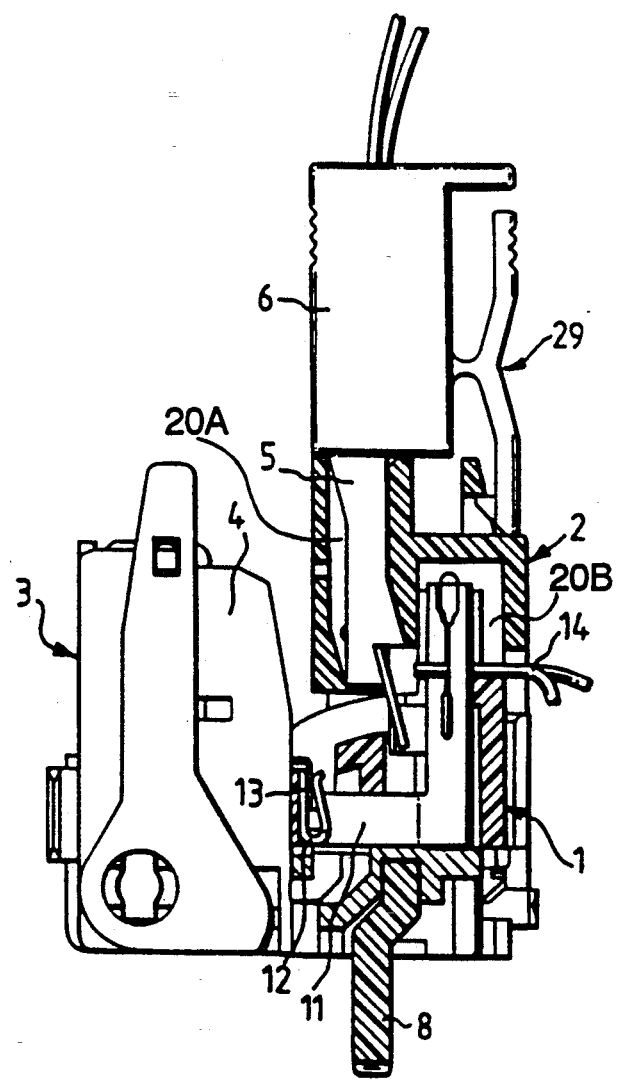

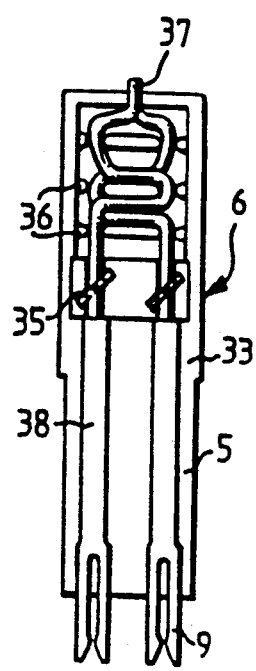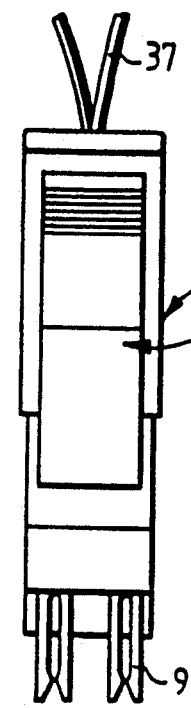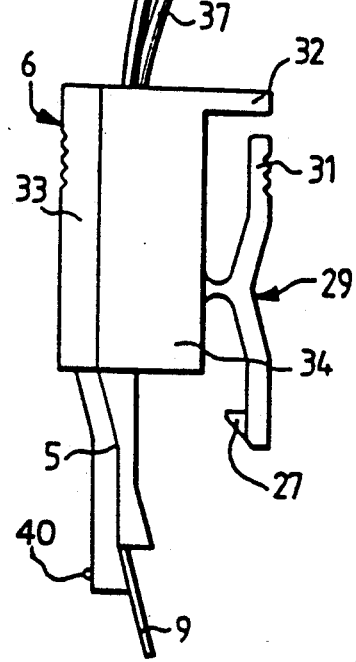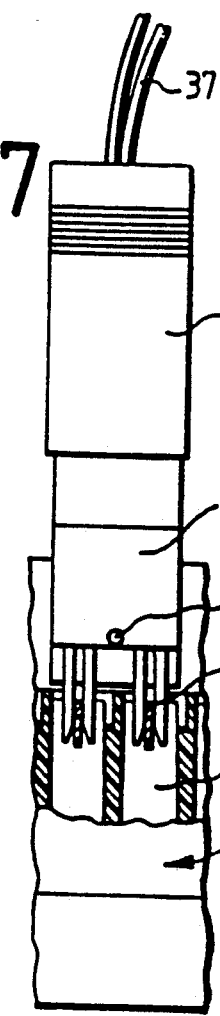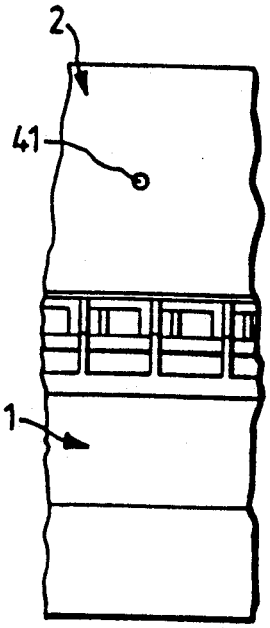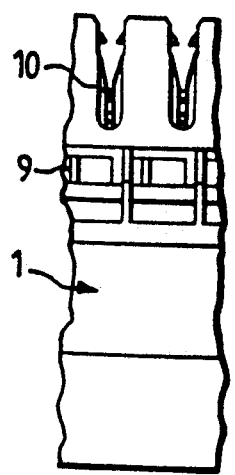

5,297,975

TERMINAL BANK FOR THE TELECOMMUNICATION AND DATA TECHNOLOGY

FIELD OF THE INVENTION

The invention relates in general to a terminal bank for the telecommunication and data technology and in particular to a terminal bank where a cable member is electrically connected to incoming wires, a plug receiver is latched to the cable member and a plug connector which is electrically connected to outgoing wires, is inserted into chambers in the plug receiver for electrically connecting the incoming wires to the outgoing wires.

BACKGROUND OF THE INVENTION

A terminal bank of the aforementioned species is known in the art by Applicant's name of Series 7. In this prior art terminal bank, a jumper member is latched onto the cable connecting member, after terminating the incoming cable cores to the cutting and clamping contact elements of the cable connecting member. The jumper member covers the row of cutting and clamping contact elements. The jumper element is provided with another row of cutting and clamping contact elements connected with bifurcated contacts, which can be plugged onto the contact lugs of the cutting and clamping contact elements adapted as blade contacts, the contact lugs being disposed in the cable connecting member. For connecting the incoming cable cores terminated at the cutting and clamping contact elements of the cable connecting member with the outgoing cable cores terminated at another terminal bank, jumper wires are terminated at the cutting and clamping contact elements of the jumper member. It is disadvantageous, herein, that for connecting the incoming cable cores to the outgoing cable cores, jumper wires are required, which, in addition, have to be loosened, when modifying a termination connection, from the cutting and clamping contact elements of the jumper member, and newly have to be contacted at other cutting and clamping contact elements, with the jumper wires needing to be shortened.

SUMMARY AND OBJECTS OF THE INVENTION

The invention is based on the object, therefore, to improve a terminal bank of the aforementioned species such that for the connection of incoming cable cores with outgoing cable cores, the application of jumper wires and further the loosening of cable cores from the cutting and clamping contact elements is avoided.

For the solution of this object, the invention provides that the terminating element is adapted as a plug connector receiving portion with chambers being open towards the top and bottom, and with plug connectors insertable thereinto and connected with the outgoing cable cores, and that bifurcated contacts are provided at the plug connectors. According to the invention, the outgoing cable cores are terminated immediately at the plug connectors. The plug connectors are insertable into the chambers at the top and bottom, and come in contact with their bifurcated contacts, the contact lugs of the cutting and clamping contact elements in the cable connecting member. The plug connector receiving portion forming the terminating element is latched onto the cable connecting member, after terminating the incoming cable cores at the cutting and clamping contact elements disposed in the cable connecting member, so that then the individual plug connectors connected with the outgoing cable cores are insertable in to the chambers of the plug connector receiving portion being open at the bottom side. A rearrangement of a conductor connection requires pulling the plug connector out, only, from the plug connector receiving portion, and inserting the plug connector into another chamber of the plug connector receiving portion, which is assigned to a specific pair of incoming cable cores. Thus, rearrangement is simplified by not having jumper wires present. Further, it is not necessary anymore to loosen cable cores from the cutting and clamping contact elements in order to rearrange the termination connection.

In another embodiment of the invention, the plug connector receiving portion covers, with a U-shaped channel disposed on the inner side in parallel to the row of chambers, the row of cutting and clamping contact elements of the cable connecting member, the plug connector receiving portion being connected with the cable terminating element through lugs provided with projections at the front side of the plug connector receiving portion. Each plug connector is inserted, with its plug connector foot, into a chamber being open towards bottom, a latch projection at the plug connector foot and a latch opening at the chamber effecting the engagement of the plug connector with only partially inserted plug connector foot. With fully inserted plug connector foot in the chamber, a latch cam forming part of a rocker will engage in a latch opening formed outside at a passing-through web of the plug connector receiving portion.

Further advantageous features of the invention are latches on the plug connector receiver portion or plug receiver, which latch the plug receiver with the cable connecting member or cable member. Also, the elements in the plug connector, forming the electrical connections, can be made in one integral piece.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a view of a terminal bank, having a cable connecting member, a latched-on plug connector receiving portion and plug connectors inserted thereinto;

FIG. 2 is a top view of the terminal bank according to FIG. 1, in part without the inserted plug connectors;

FIG. 3 is a cross-section through the terminal bank with only one pre-latched plug connector;

FIG. 4 is a cross-section through the terminal bank with a fully latched-in plug connector and terminated surge suppressor magazine;

FIG. 5 is a partial view of the cable connecting member without a plug connector receiving portion;

FIG. 6 is a partial view of the cable connecting member with a plug connector receiving portion;

FIG. 7 is a partial view of the cable connecting member with a plug connector receiving portion and inserted plug connector;

FIG. 8 is a side view of a plug connector;

FIG. 9 is a front view of a plug connector; and

FIG. 10 is a top view of the housing portion of the opened-up plug connector receiving the bifurcated contacts and the cutting and clamping contact elements.

DETAILED DESCRIPTION OF THE PREFERRED EMBODIMENT

The terminal bank for the telecommunication and data technology has a cable connecting member 1, a plug connector receiving portion 2 forming the terminating element, a magazine receiving portion 3 for the surge arrester magazine 4 provided at a longitudinal side of the cable connecting element 1, and a multitude of plug connectors 6 inserted with their plug connector feet 5 into the plug connector receiving portion 2.

The cable connecting member 1 made of plastic and having a cable guide bracket 8 on its bottom side, comprises a plastic body having a stepped cross-section, the portion of which shown in FIGS. 3 and 4 on the right-hand side being higher and receiving a row of cutting and clamping contact elements or cutting/clamping means 10, which are connected at their central portions directed to the left-hand side in FIGS. 3 and 4, with contact lugs 7, and at their bottom ends, with termination lugs 11 carrying bifurcated contacts 12 at their free ends. Thereunto engage tapping contacts 13 of the surge arrester magazine 4. At each cutting and clamping contact element 10, the incoming cable core 14 is terminated in solderless, screwless and stripless manner.

The plug connector receiving portion 2 is latched onto the cable connecting member 1, for which purpose the plug connector receiving portion is provided with one lug 15 each on the front side. The lug 15 is in turn provided with projections 16 engaging behind latch webs 17 provided on the longitudinal sides of the cable connecting member. On the front side, each plug connector receiving portion 2 carries a cable guide 18, as can be seen in FIG. 1.

The plug connector portion 2 comprises a plastic body, which forms, on the right-hand side in FIGS. 3 and 4, between the one outside wall 19 and its central wall 21, a U-shaped channel 20 having legs 20A and 20B. This U-shaped channel 20 is plugged onto the higher portion of the plastic body of the cable connecting member 1, and secures, thus, the cutting and clamping contact elements 10 present in the higher portion of the cable connecting member 1 and the cable cores 14 connected thereto. In parallel thereto extends, above the longitudinal side having a small height of the plastic body, the central wall 21 and the other outside wall 22, which form chambers 23 therebetween, divided by transverse walls 24. The chambers 23 are open towards the top and bottom, and form, insertion channels for the plug connector foot 5 of the plug connector 6, as is shown in FIGS. 3 and 4. On the outside of the plug connector portion 2, opposite to the channel 20, approximately above the one outside wall 19, a passing-through web 25 is formed at the plug connector portion 2. This web 25 is provided with latch openings 26 for latching latch cams 27. The plug connector feet 5 are inserted into the chambers 23 of the plug connector portion 2, and the latch cams 27 are inserted into the latch openings 26 of the web 25 of the plug connector portion 2. The latch cams 27 are, on the inside of the one end of a rocker 29 pivoted at the housing 28 of the plug connector 6. The rocker 29 being connected, in a longitudinal center, over a web 30 with the housing 28 of the plug connector 6. A web button 31 is formed at the other end and secured, by a wall 32 disposed at the housing 28 of the plug connector 6, against unintentional actuation. When pressing on the web button 31, the latch cam 27 is unlocked from the latch opening 26, and the plug connector 6 can be removed from the plug connector portion 2.

The housing 28 of each plug connector 6 is composed of two housing portions 33, 34, which are latched with each other, in a non-shown manner. Each housing portion 33, 34 also forms part of the plug connector foot 5. In the housing portion 33, cutting and clamping contact elements 35 and clamping ribs 36 made of plastic are inserted, serving for terminating or fixing, resp., the outgoing cable core 37 connected at the plug connector 6. The cutting and clamping conductive, metal strips 38 with the bifurcated contacts 9, projecting at the free end of the plug connector foot 5 therefrom. After inserting the outgoing cable cores 37 into the cutting and clamping contact elements 35 by a solderless, screwless and stripless connection, the second housing portion 34 is placed thereon. The housing portion carrying the rocker 29, as is shown in FIG. 8.

Each plug connector foot 5 comprises, at its rear side, a latch projection 40. Each channel 20 of the plug connector portion 2 is provided with a latch opening 41 for engagement of the latch projection 40 with an only partially inserted plug connector foot 5. The latch opening 41 being provided in the outside wall 22 of the plug connector portion 2. As is shown in FIG. 3, the plug connector 6 can be pre-inserted without an electrical connection being established (switch-off position) between the clamping contact elements 10 in the cable connecting member 1 and the outgoing cable cores 37 terminated at the cutting and clamping contact elements 35 in the plug connector 6. For connecting the cable cores 14, 37, the plug connector 6 is, as is shown in FIG. 4, fully inserted with its plug connector foot 5 into its channel 20. The bifurcated contacts 9 of the plug connector 6 come into contact with the contact lugs 7, which are fixedly attached to the inside of the cutting and clamping contact elements 10 positioned in the cable connecting member 1 (switch-on position).

By pulling the plug connector 6 out, the connection between an incoming cable core 14 and an outgoing cable core 37 is interrupted. By inserting the plug connector 6 into another chamber 23, a rearrangement of the outgoing cable core 37 can be performed at the termination at another incoming cable core 14, without a jumper wire having to be pulled out, and without a cable core 14 or 37 having to be loosened from its cutting and clamping contact element 10 or 35.

While specific embodiments of the invention have been shown and described in detail to illustrate the application of the principles of the invention, it will be understood that the invention may be embodied otherwise without departing from such principles.

What is claimed is:

1. A connection system for switching connections between a plurality of incoming and outgoing wires, the system comprising:

a cable connecting member including a plurality of cutting/clamping means for electrically connecting to the plurality of incoming wires, each of said plurality of said cutting/clamping means electrically connecting to a separate one of the plurality of incoming wires, each of said cutting/clamping means being electrically connected to a separate contact lug and each of said plurality of cutting/clamping means having an opening for receiving one of said incoming wires when moved in a first direction;

a plug receiver having means for latching onto said cable connecting member when moved in said first direction, said plug receiver defining a plurality of chambers, each of said plurality of chambers being in communication with a separate group of said contact lugs of said cable connecting member said plug receiver also defining a channel, a portion of said channel covering said opening of said cutting/clamping means and securing the plurality of incoming wires in said cutting/clamping means when said plug receiver is latched to said cable connecting member; and a plurality of plug connectors, each of said plurality of plug connectors having foot means for inserting into one of said chambers, each foot means of said plurality of plug connectors having a plurality of bifurcated contact means for electrically connecting with said separate group of said contact lugs when said plug receiver is latched onto said cable connecting member, each of said plurality of bifurcated contact means forming a separate electrical connection with each of said contact lugs, each of said plurality of plug connectors having a plurality of cutting/clamping means for electrically connecting to said plurality of bifurcated contact means, each of said plurality of cutting/clamping means separately connecting to each of said plurality of bifurcated contact means, each of said cutting/clamping means also separately connecting to the plurality of incoming wires, each of said plug connectors being insertable into and switchable between any of said chambers for selectively electrically connecting one of the plurality of incoming wires with one of the plurality of outgoing wires.

2. A terminal bank in accordance with claim 1, wherein:
said means on said plug receiver for latching to said cable connecting member includes lugs extending from a bottom side of said plug receiver, and projection means extending from said lugs for connecting said plug receiving portion to said cable connecting member.

3. A terminal bank in accordance with claim 1, wherein:
said connector foot means includes a latch projection; and
said plug receiver also defines a latch opening in said one of said chambers, said latch opening being positioned to engage with said latch projection when said connector foot means is partially inserted into said one of said chambers of said plug receiver.

4. A terminal bank in accordance with claim 1, wherein:
said each of said plug connectors includes a housing formed of first and second housing portions, said first and second housing portions containing said cutting/clamping means of a corresponding one of said each of said plug connectors, said first and second housing portions including clamping ribs for fixing said outgoing cables.

5. A terminal bank in accordance with claim 1, wherein:
said cutting/clamping means of said each of said plug connectors are electrically connected to correspondingly bifurcated contact means by electrically conductive strips, said cutting/clamping means of said each of said plug connectors, said corresponding bifurcated contact means and electrically conductive strips are integrally formed.

6. A system in accordance with claim 1, wherein:
said plurality of cutting/clamping means of said cable connecting member and said plug connector form said electrical connections in a solderless, screwless and stripless manner.

7. A system in accordance with claim 1, wherein:
each of said foot means includes a latch projection; and
said plug receiver also defines a latch opening in said plurality of chambers, said latch opening being positioned to engage with said latch projection when each of said foot means is partially inserted into one of said plurality of chambers and hold said bifurcated contact means away from and out of electrical contact with said contact lug.

8. A system in accordance with claim 1, wherein:
said cable connecting member includes tapping contact means positioned on a lateral side of said cable connecting member for engagement with a surge arrestor magazine, said tapping contact means being electrically connected to said cutting/clamping means of said cable connecting member.

9. A connection system in accordance with claim 1, wherein:
said plurality of cutting/clamping means of said cable connecting member are positioned substantially in a row on a lateral side of said cable connecting member;
each of said contact lugs being substantially aligned in another row substantially in parallel with said row of cutting/clamping contacts.

10. A connection system in accordance with claim 8, wherein:
said plurality of cutting/clamping contact means of said cable connecting member are positioned substantially in a row on another lateral side of said cable connecting member substantially opposite said lateral side of said tapping contact means;
each of said contact lugs being substantially aligned in another row substantially in parallel with said row of cutting/clamping contact means.

11. A connection system in accordance with claim 1, wherein:
each of said plurality of plug connectors connecting to two (2) of the plurality of incoming wires, said each plug connector separately electrically connecting said two (2) incoming wires to two (2) of said contact lugs of said cable connecting member.

12. A connection system between a plurality of incoming and outgoing wires, the system comprising:
a cable connecting member including a plurality of cutting/clamping means for electrically connecting to the plurality of incoming wires, each of said plurality of said cutting/clamping means electrically connecting to a separate one of the plurality of incoming wires, each of said cutting/clamping means being electrically connected to a separate contact lug, said each of said cutting/clamping means being positioned substantially in a row on a lateral side of said cable connecting member and having an opening for receiving one of said incoming wires when moved in a first direction, said contact lugs also being positioned substantially in another row substantially parallel to said row of cutting/clamping means;

a plug receiver having means for latching onto said cable connecting member in said first direction, said plug receiver having a portion covering said openings of said plurality of cutting/clamping means of said cable connecting member and securing the incoming wires in said cutting/clamping contacts of said cable connecting member when said plug receiver is latched to said cable connecting member, said plug receiver also having means for electrically connecting the plurality of outgoing wires to said contact lugs of said cable connecting member.

13. A terminal bank for telecommunication and data transfer, the terminal bank comprising:

a cable connecting member including cutting/clamping contact means for termination of incoming cable cores, said cable connecting member also including contact lugs electrically connected to said cutting/clamping contact means;

a plug connector receiving portion having means for latching onto said cable connecting member, said plug connector receiving portion defining chambers open towards a top and bottom, said plug connector receiving portion also defines a substantially U-shaped channel pluggable onto said cutting/clamping means of said cable connecting member;

a plurality of plug connectors, each of said plurality of plug connectors including connector feet means for inserting into one of said chambers of said plug connector receiving portion, said connector feet means including bifurcated contact means for electrically connecting with said contact lugs of said cable connecting member when said plug connector receiving portion is latched to said cable connecting member and said connector feet means is inserted into said one of said chambers, said each of said plurality of plug connectors including cutting/clamping means for electrical connection with outgoing cable cores and being electrically connected to said bifurcated contact means, each of said plurality of plug connectors being insertable into and switchable between any of said chambers for selectively connecting one of the incoming wires with one of the outgoing wires, said plug connector receiving portion having a passing-through web, said passing-through web being positioned substantially outside and extending alongside and substantially parallel to one leg of said substantially U-shaped channel, said passing-through web defining a latch opening, and said each of said plug connectors including a latch cam means for engaging with said latch opening when said connector feet means is inserted into said one of said chambers of said plug connector receiver portion.

14. A terminal bank in accordance with claim 13, wherein:

said latch cam means includes a rocker pivotably mounted to a housing of said plug connector by a web at a longitudinal center of said rocker, said rocker including a latch cam at one end engaging with said latch opening when said connector feet means is inserted into said one of said chambers, said rocker having a rocker button at another end.

* * * * *